United States Patent [19]

Basu

[11] Patent Number: 4,458,057

[45] Date of Patent: Jul. 3, 1984

[54] PROCESS FOR PRODUCING SPHERICAL AND POROUS VINYL RESIN PARTICLES

[75] Inventor: Pijus K. Basu, Brecksville, Ohio

[73] Assignee: The BF Goodrich Company, Akron, Ohio

[21] Appl. No.: 437,097

[22] Filed: Oct. 27, 1982

[51] Int. Cl.$^3$ ................................................ C08F 2/20
[52] U.S. Cl. ....................................... 526/88; 521/56; 521/65; 526/202; 526/344.2; 526/344.3
[58] Field of Search ................... 526/88, 344.2, 344.3, 526/202; 521/65, 56

[56] References Cited

U.S. PATENT DOCUMENTS

| | | | |
|---|---|---|---|
| 3,620,988 | 11/1971 | Cohen | 260/17.4 |
| 3,907,730 | 9/1975 | Jones | 260/17.4 |
| 4,229,547 | 10/1980 | Cohen et al. | 521/145 |
| 4,360,651 | 11/1982 | Dinbergs | 521/65 |

*Primary Examiner*—Morton Foelak

*Attorney, Agent, or Firm*—Joe A. Powell; Alan A. Csontos

[57] ABSTRACT

There is disclosed a process for making vinyl polymer particles that are spherical, highly porous and of uniform size and substantially no polymer buildup on the reactor surfaces. A dispersion or emulsion is first formed with high agitation comprised of an aqueous medium containing a water-insoluble suspending or dispersing agent, the monomer or monomers to be polymerized, a monomer-soluble free radical yielding catalyst, and a surfactant or surfactant system. The dispersion is neutralized with an alkali and then polymerized with stirring to a conversion of about 10% to about 30% and then continuing the reaction to completion with increased stirring, the stirring in both instances being no greater than that used in making the dispersion or emulsion. The dispersing agent employed comprises an unneutralized crosslinked interpolymer of one or more carboxylic acid monomers with a polyunsaturated compound having a plurality of terminally unsaturated polymerizable groups.

16 Claims, No Drawings

PROCESS FOR PRODUCING SPHERICAL AND POROUS VINYL RESIN PARTICLES

BACKGROUND OF THE INVENTION

Many polymerizable monomeric materials, and particularly vinyl chloride, are being polymerized today on a large scale commercially either in suspension media or in aqueous dispersion or emulsion, that is, latex form, employing various colloidal suspension agents, emulsifiers or soaps, and/or synthetic detergent-type dispersing agents. In these methods of polymerization, and particularly in suspension polymerization, agitation, which is usually vigorous, is depended on to suspend and/or disperse the monomer particles or droplets throughout the reaction media and to maintain such suspension or dispersion during the polymerization reaction and to assist in heat transfer to the reactor cooling surfaces. However, in most instances, polymer particles produced in accordance with these processes are not uniform in size and shape. This is due, in most instances, to the instability of the monomer dispersion which causes agglomeration of the polymerizing particles. In subsequent processing of these polymers, such as, for example, polyvinyl chloride (PVC), it is desirable to have uniform size and shape in the polymer particles.

Various polymerization processes, and modifications of existing processes, have been heretofore proposed to obtain spherical unagglomerated resin particles of uniform size. For example, one very successful method has been proposed and described in U.S. Pat. No. 3,620,988. In said patented method, a monomeric material, such as vinyl chloride, of low solubility in water, containing a monomer-soluble free radical type catalyst, is suspended as discrete droplets of a desired size in an aqueous medium thickened with a water-insoluble polymeric gellation agent which imparts plastic flow properties to such medium. The polymerization reaction is then carried out using a batch or continuous process under substantially quiescent conditions, that is, in the absence of turbulence or the absence of shearing forces sufficient to deform the suspended droplets of monomer and/or to damage the polymer bead at any stage of conversion. However, when polymerizing vinyl chloride by such a process, the uniform beads of PVC that are formed are normally clear and glassy in nature and do not have the desired porosity, which is desirable in subsequent operations involving the finished polymer.

There are many cases where porous polymer particles or beads are desirable, such as where the polymer, such as PVC, is to be employed in making plastisols and in extrusion operations. Porous beads would also be desirable in the case of PVC where, because of Government regulations, it is necessary to remove substantially all of the unreacted vinyl chloride therefrom. Porous polymer beads or particles would greatly facilitate such removal.

Another real problem in the manufacture of vinyl resins is polymer buildup on the inner surfaces of the reactor during the polymerization reaction. This is particularly prevalent in the commercial production of vinyl chloride polymers when the same are produced in the form of discrete particles by polymerization in an aqueous suspension system. When employing such a system, the monomer(s) are maintained in the form of small discrete droplets by the use of suspending agents and agitation. When the reaction is complete, the resultant polymer is washed and dried. These aqueous suspension system polymerization reactions are usually conducted under pressure in metal reactors, or glass-lined reactors, equipped with baffles and high speed agitators. However, as pointed out above, these suspension systems under many circumstances are unstable and during the polymerization reaction, the polymer builds up on the interior surfaces of the polymerization reactor, including the surfaces of the baffles and agitator. Obviously, this polymer buildup must be removed since it results in further formation of polymer buildup on the reactor surfaces which results in a crust that adversely affects heat transfer and contaminates the polymer being produced. Removal of such polymer buildup is difficult and costly and the desirable way of eliminating the polymer buildup is providing a means of polymerization which substantially eliminates its formation in the first place.

Thus a process which is capable of producing vinyl resin particles which are spherical and porous throughout, and which will also substantially eliminate polymer buildup in the reactor, is most desirable.

SUMMARY OF THE INVENTION

In the process of the present invention there is first formed a dispersion or emulsion comprised of the monomer or monomers to be polymerized, a surfactant, or surfactant system, and a monomer-soluble free radical yielding polymerization catalyst, in an aqueous medium containing a water-insoluble suspending or dispersing agent comprising an unneutralized cross-linked interpolymer of one or more carboxylic acid monomers with a polyunsaturated compound having a plurality of terminally unsaturated polymerizable groups. Said dispersion is formed using high agitation at a temperature below the reaction temperature of the catalyst. The dispersion is partially neutralized with an alkali and then polymerized with stirring to a conversion of about 10% to about 30%, said stirring being substantially less than that used in making the dispersion and then continuing the reaction to completion with increased stirring but no greater than that used in making the dispersion. The resultant polymer particles are non-agglomerated, spherical, highly porous and have the same size distribution as the original liquid dispersion. Thus, by starting with a dispersion of uniform droplet size, one can obtain polymer particles which are also uniform. There is substantially no polymer buildup on the reactor surfaces.

DETAILED DESCRIPTION

While the present invention is described hereinafter with regard to the polymerization of vinyl chloride, it is to be understood that this is merely for purposes of illustration and convenience since the present process may likewise be employed in the polymerization of any polymerizable ethylenically unsaturated monomer or monomers and particularly where, under normal conditions, undesirable polymer buildup occurs. As examples of such monomers, there may be named other vinyl halides and vinylidene halides, such as vinyl bromide, vinyl fluoride, vinylidene chloride, etc., vinylidene monomers having at least one terminal $CH_2=C<$ grouping, such as acrylic acid, methacrylic acid, acrylonitrile, vinyl acetate, and the like; esters of acrylic acid, for example, methyl acrylate, ethyl acrylate, butyl acrylate, octyl acrylate, cyanoethyl acrylate, and the like; esters of methacrylic acid, such a methyl methacrylate, ethyl methacrylate, butyl methacrylate, and the like;

styrene and styrene derivatives including α-methyl styrene, vinyl toluene, chlorostyrene; vinyl naphthalene; diolefins including butadiene, isoprene, chloroprene, and the like; and mixtures of any of these types of monomers and other unsaturated polymerizable olefinic monomers copolymerizable therewith; and other polymerizable olefinic monomers of the types known to those skilled in the art.

The present invention, however, is particularly applicable to the polymerization of vinyl chloride either alone or in admixture with one or more other vinylidene monomers having at least one terminal $CH_2=C<$ grouping, copolymerizable therewith in amounts as great as about 80% or more by weight, based on the weight of the monomer mixture.

The monomer-soluble or oil-soluble catalysts that may be used in the polymerization process of the present invention are the alkanoyl, aroyl, alkaroyl, aralkanoyl diperoxides and monohydroperoxides, azo compounds, peroxy esters, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, di-secondary butyl peroxydicarbonate, t-butyl peroxyneodecanoate, di-normal propyl peroxydicarbonate, azo-bus-isobutyronitrile, αα-azodiisobutyrate, 2,2'-azo-bis-(2,4-dimethyl valeronitrile), and many others. The particular free radical catalyst employed will depend upon the monomer(s) being polymerized, the molecular weight and color requirements of the polymer, the temperature of polymerization, etc. Insofar as the amount of catalyst employed is concerned, it has been found that an amount in the range of about 0.005% to about 1.0% by weight, based on the weight of the monomer or monomers being polymerized, is satisfactory. However, it is preferred to employ an amount of catalyst in the range of about 0.01% to about 0.20% by weight.

An important aspect of the instant invention is the water-insoluble suspending or dispersing agent that is employed in order to stabilize the dispersed monomer droplets against coalescent. The dispersing agent employed is an unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is necessary since an uncrosslinked polyacrylic acid polymer will produce a highly agglomerated charge, that is, due to an unstable environment, the polymer particles coalesce producing the agglomerates. Due to the crosslinking the interpolymers are incapable of forming a true solution in water and thus are classified as water-insoluble. However, the structure of the interpolymer must be such that is has enough affinity for water to swell appreciably in an aqeuous medium, thus thickening the water phase but not to the extent that it cannot be agitated, as hereinafter described. Interpolymers that have little or no affinity for water and do not swell to any measurable degree, are not suitable for the purposes of the present invention.

After forming the dispersion or emulsion of the polymerization reaction ingredients and prior to polymerization thereof, it is necessary, and most important to partially neutralize the reaction medium, and mainly the dispersing agent therein, in order to insure the stabilization of the monomer droplets therein during the subsequent stirred reaction period. This neutralization is accomplished by adding to the reaction medium, prior to the start of the polymerization reaction, a water-soluble base, such as sodium hydroxide, in order to adjust the pH of said medium in a range of about 4.0 to about 7.0. This adjustment in pH is made in order to obtain sufficient "yield value" in the medium, as described hereinafter. The viscosity of the polymerization medium can be regulated by adjusting the amount of suspending or dispersing agent added thereto and its degree of neutralization.

The amount of suspending or dispersing agent that is required for proper yield value is easily determined. The minimum yield value required in aqueous polymerization medium for suspension stability with any given monomeric material depends on several factors, namely, (1) the density difference between monomeric and aqueous phases, labeled $D-D_o$ and expressed as grams/cm$^3$; (2) the desired or actual radius (R) of the suspended monomer droplet, expressed in cm.; and (3) the acceleration of gravity (g) expressed in cm./sec.$^2$, usually 980 cm./sec.$^2$. The minimum Brookfield Yield Value (BYV) for permanent suspension can be calculated by the formula:

$$BYV = [25.6R(D-D_o)g]^{2/3} \tag{I}$$

wherein the terms are as identified above.

In practice, it is desirable to employ aqueous media having a BYV in excess of the calculated minimum in order to make certain that suspension stability is easily achieved and is fully maintained throughout the reaction. It is satisfactory to employ aqueous polymerization media having a measured or actual BYV at least 50% and preferably from about 200% to about 600% or more, higher than the calculated minimum.

Actually, BYV values are measured or calculated from rheological data obtained by the use of the Brookfield RVT Viscometer, operated at the temperature to be utilized in the polymerization, whereby one measures the Brookfield apparent viscosity (BAV) in centipoises at 0.5 rpm. and at 1.0 rpm. If these data are plotted against shear rate and the curve extrapolated to zero shear rate, the BYV is obtained directly. However, the minimum BYV for permanent stability can be approximated from the formula:

$$\text{Approx. } BYV = \frac{BAV @ 0.5 \text{ rpm} - BAV @ 1.0 \text{ rpm}}{100} \tag{II}$$

In many cases, a useful and easiily measured and calculated viscometric parameter is the ratio (R') of the BYV divided by the apparent Brookfield viscosity measured at 20 rpm. This ratio will vary somewhat depending on the magnitude of BYV. The formula (I) above incorporates an empirical correction factor which compensates for this error.

In general, BYV values with the suspending or dispersing agents of the present invention will be, at a minimum, in the range of about 20 to about 50 for the usual monomers and particle sizes. Most often, with many of these monomers, the practical operating range will be from about 50 to about 120. The Brookfield apparent viscosity at 20 rpm. of the polymerization media of such BYV will be in the range of about 760 to about 1500 centipoises.

The carboxylic acid monomers, which are useful in preparing the crosslinked polymeric dispersing or suspending agents, are those which contain at least one active carbon to carbon double bond in the α,β-position with respect to a carboxyl group having the formula

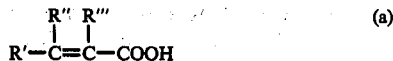  (a)

within R' is hydrogen or a —COOH group, and each of R" and R"' is a hydrogen or a monovalent substituent group which is linked to one of the doubly bonded carbon atoms. Carboxylic acids within this definition include acids, such as acrylic and, wherein the double bond is terminal thusly

  (b)

or the dicarboxylic acids, such as maleic acid, and other anhydrides having the general formula

  (c)

wherein R and R' are monovalent substituent groups and especially those selected from the group consisting of hydrogen, halogen, alkyl, aryl, alkaryl, aralkyl, and cycloaliphatic radicals.

Included within the class of carboxylic acids, shown by generic formula (a) above, are widely divergent materials, such as acrylic acid itself, methacrylic acid, ethacrylic acid, α- and β-chloro- and bromo-acrylic acids, crotonic acid, maleic acid, itaconic acid, and many others.

Polymerizable carboxylic anhydrides include any of the anhydrides of the above acids, including mixed anhydrides, and those shown by generic formula (C) above, including maleic anhydride, and others. In many cases it is preferred to copolymerize an anhydride monomer with a comonomer, such as methyl vinyl ether, styrene, and the like.

In the present invention, it is preferred to employ polymeric suspending agents which are derived from polymers produced by the polymerization of the αβ-monoolefinically unsaturated carboxylic acids. The preferred carboxylic acids are those derived from the acrylic acids and α-substituted acrylic acids having the general formula

  (d)

wherein R is a monovalent substituent selected from the group consisting of hydrogen, halogen, hydroxyl, carboxyl, amide, ester, lactone, and lactam groups.

The most preferred polymeric suspending agents are those prepared from the lightly crosslinked interpolymers of acrylic acid since these are the most efficient. The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters, -nitriles, -acids, -acid anhydrides, -ketones, -alcohols and polyunsaturated compounds of this class incorporating one or more of these and other functional groups. Specifically, there may be used divinyl benzene, divinyl naphthalene, low molecular weight and soluble polymerized dienes, such as, polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bis-acrylamide, methylene bismethacrylamides, triacrylyl triazine, hexallyl trimethylene trisulfone and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyalyl, -vinyl, and -crotyl poly ethers containing from 2 to 7 or more of these or other alkenyl ether groupings per molecule and made from polyhydric alcohols, such as the carbohydrate sugars, and the so-called "sugar alcohols", including erythritol, pentaerythriotol, arabitol, iditol, mannitol, sorbitol, inositol, raffinose, glucose, sucrose, and many others; and other polyhydroxy carbohydrate derivatives; the corresponding polyalkenyl silanes, such as the vinyl and allyl silanes; and others. Of this large class of crosslinking agents, the polyalkenyl polyethers of the carbohydrate sugars, sugar alcohols, and other polyhydroxy carbohydrate type derivatives containing from 2 to 7 alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the polyhydroxy carbohydrate derivatives.

In the monomeric mixture for making the crosslinked polymers employed as suspending agents in the polymerization process of the present invention, the two essential monomeric materials should be present in certain proportions, although the exact proportions will vary considerably depending on the characteristics desired in the polymer. Small amounts of the polyalkenyl polyether on the carboxylic monomer is so strong that as little as 0.1% by weight thereof, based on the weight of the total mixture, produces a great reduction in the water- and solvent-solubility of the resulting crosslinked polymer. When 0.1% to 4.0%, more preferably 0.2% to 2.5%, by weight of the polyether is utilized, water-insoluble polymers are obtained, especially with acrylic acids, which are extremely water-sensitive. Useful dispersing agents are also obtained when 0.1% to 6.0%, and preferably 0.2% to 5.0%, by weight of the polyether is copolymerized with maleic anhydride. In the dual copolymer, or two-component interpolymer, this means that the remainder of the monomeric mixture will be carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxylic monomer or monomers should nevery be less than 25%, and preferably not less than 40%, by weight of the total monomeric mixture. Multi-component interpolymers may be made from monomeric mixtures comprising from 25% to 95% of a carboxylic monomer, such as acrylic acid, 0.1% to 30% of a polyalkenyl polyether, such as polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are monoolefinic vinylidene monomers containing one terminal $CH_2=C<$ group, such as styrene, the chloro- and ethoxy-styrenes, etc., acrylamide, N-methyl-acrylamide, N,N-dimethyl acrylamide, acrylonitrile, methacrylonitrile, methyl acrylate, ethyl acrylate, 2-ethylhexylacrylate, methyl methacrylate, vinyl acetate, vinyl benzoate, vinyl pyridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers. Of the above additional monomers, N-methyl acrylamide, methyl vinyl ether, ethyl vinyl ether and divinyl ether have been found particularly useful in the production of the unneutralized crosslinked interpolymers for use as water-insoluble suspending agents in the polymerization process of the instant invention.

One important aspect of the present invention is the choice of surfactant or surfactant system. It is necessary that the surfactant or surfactants chosen for use in the invention be such that at least one of the surfactants contain one or more poly(ethylene oxide) (PEO) segments. It has been found that the water-insoluble crosslinked suspending agent in the reaction medium is an indispensable part of the surfactant system. The ability of the surfactant to prevent "drop sticking", that is, to prevent the monomer droplets from coalescing, is due to the complexing, or association, of the same with the suspending agent. This, of course, prevents agglomeration in the finished product or polymer. It is believed that the key to the mechanism for preventing agglomeration lies in the hydrogen bonding interaction between the PEO segments of the surfactant and the unneutralized —COOH groups on the suspending agent chains. It has been found that the satisfactory amount of surfactant or surfactants, useful in the present invention, will be in the range of about 0.005% to abut 1.0% by weight based on the weight of the monomer or monomers to be polymerized. Preferably, an amount of such surfactant(s) in the range of about 0.02% to about 0.5% is employed.

With respect to the surfactants, it has been demonstrated that there is a minimum length that the PEO segments must have in order that they can be effective in complexing with the water-insoluble crosslinked suspending agents in the reaction medium and thus prevent drop sticking. This minimum length has been found to be between 11 and 15 PEO (poly(ethylene oxide)) units. Surfactants having shorter PEO segment lengths are only partially effective in most cases and the resin particles produced from a stirred reaction are larger and have a broader size distribution. This is believed to be due to partial drop agglomeration in the early stages of the reaction.

Among the surfactants useful for the purpose of preventing the monomer droplets from coalescing are those falling within the following generic classes: (1) polyoxyethylene alkylphenols; (2) polyoxyethylene alcohols; (3) polyoxyethylene esters of fatty acids; (4) polyoxyethylene alkylamines; (5) polyoxyethylene alkylamides; and (6) polyalkylene oxide block copolymers. As examples of surfactants in the above-named classes there may be named the following: polyoxyethylene (20) sorbitan monooleate, polyoxyethylene (20) sorbitan monopalmitate, polyoxyethylene (20) sorbitan monostearate, polyoxyethylene (40) stearate, polyoxyethylene (50) stearate, polyoxyethylene esters of mixed fatty resins acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. As examples of the block copolymer surfactants in the family of surfactants manufactured by BASF/Wyandotte and sold under the trademark "Pluronic". These surfactants are polyethylene oxide-polypropylene oxide block copolymers and have the following general formula:

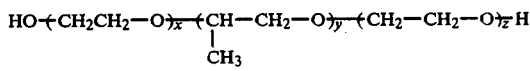

wherein the sum of x and z is an integer from 1 to 212 and y is an integer from 16 to 69.

These compounds have a multiplicity of functional groups and accordingly, a very large number of modifications is possible. As pointed out above, mixtures of said compounds can also be used. Any amounts of the polyethylene oxide surfactants in combination may be employed so long as the combined weight thereof is within the ranges of surfactant(s) given above.

Surfactants, other than the essential polyethylene oxide-containing materials referred to above, may also be added to the reaction mixture for the purpose of improving the porosity of the vinyl resin particles or for otherwise modifying or controlling the internal structure, or skin structure, of the vinyl resin particles. Surfactants employed for this purpose are chosen on the basis of their Hydrophile-Lipophile Balance (HLB) values and include all the general classes of compounds listed above, even though the polyethylene oxide segment length is of no importance with respect to these additional surfactants. Also, useful surfactants are those compounds from the sorbitan ester family or the polyol families, as well as the polyvinyl alcohols, which do not contain polyethylene oxide segments. As examples of such surfactants there may be named sorbitan tioleate, sorbitan tristearate, sorbitan monooleate, sorbitan monopalmitate, Alcotex, which is 72.5% hydrolyzed polyvinyl acetate, and the like. The satisfactory surfactants for improving the vinyl resin porosity and internal structure of the polymer particles will have an HLB in the range of about 2 to about 19 and preferably an HLB in the range of about 2 to about 6. These surfactants, which are added to enhance monomer droplet stabilization and polymer porosity, can be employed in any relative amounts so long as the polyethylene oxide containing surfactant is added within the ranges specified hereinabove.

When employing the polyethylene oxide containing surfactants alone, a skin is formed around the polymer particle. However, this skin is so thin that plasticizers can penetrate it when making polymer compounds. On the other hand, when a surfactant, which does not contain a polyethylene oxide segment, is added to the system, the skin on the polymer particle has holes in it which improves the plasticizer uptake rate. It must be emphasized, however, that the polyethylene oxide segment containing surfactant must be present in order to obtain the required stability of the reaction medium or mixture.

As has been pointed out previously, it is most important to neutralize the reaction medium, and mainly the dispersing agent therein, in order to insure the stabilization of monomer droplets during the subsequent stirred reaction period. That is to say, the manner of forming the monomer emulsion or dispersion is most important and the point at which the alkali solution is added to the emulsion, in order to get the desired yield value in the polymerization medium, is critical. It has been found that if this procedure is reversed in order, that is, by adding the alkali solution first and then forming the emulsion, the resultant monomer droplets do not have the resistance to droplet sticking that is characteristic of these systems even though the appropriate polyethylene oxide surfactants are present. This was demonstrated by two test runs that were made using the following recipe in both runs wherein the parts are by weight:

| | |
|---|---|
| Water (demineralized) | 200 parts |
| Vinyl Chloride | 100 parts |
| (1)Dispersing Agent | 0.12 part |
| Nonylphenoxypoly(30)ethyleneoxy ethanol | 0.08 part |
| Nonylphenoxypoly(4)ethyleneoxy ethanol | 0.10 part |
| Di-(secondary butyl) peroxydicarbonate | 0.03 part |
| Sodium hydroxide | 0.011 part |

(1)Carboxylic form of copolymer of anhydrous acrylic acid and mixture of polyallyl ethers of sucrose containing an average of 3 to 6 allyl ether groups per molecule.

In the first run the alkali was added at the beginning to bring the pH up to 5.0 followed by 35 minutes of emulsification. In the second run, emulsification was done in unneutralized dispersing agent, before adding the NaOH, followed by a short period of blending in the NaOH. The total emulsification time was the same in both runs. The result was that the second run, wherein the NaOH was added later, was a perfectly normal run when stirred at 50 rpm during the reaction. On the other hand, in the first run wherein the NaOH was added at the beginning, stirring at 50 rpm. quickly resulted in the emulsion breaking due to droplet sticking and the run had to be aborted within an hour. It should be noted that the emulsification procedure affects only the resistance to droplet sticking and this difference in emulsification procedure is not important unless the reaction is a stirred one, such as in the process of the present invention. In a quiescent reaction, such as described in U.S. Pat. No. 3,620,988, the monomer droplets are suspended by the mucilage and do not collide with each other so that the necessity of preventing monomer droplet sticking does not arise. Thus, it can be seen that the choice of the neutralization procedure in the present invention is critical in order to attain the desired objectives.

In addition to the use of sodium hydroxide, other alkali metal hydroxides may be employed, such as potassium hydroxide, lithium hydroxide, and the like, and also ammonium hydroxide. It is preferable to add the hydroxides to the emulsion or polymerization medium, after emulsification is complete, by means of an aqueous solution thereof. Satisfactory solutions are those containing from about 1.0% to about 50.0% by weight of the alkali metal hydroxide or ammonium hydroxide. Preferably, an aqueous solution containing from about 10.0% to abut 25.0% of the hydroxide is employed.

Another very important aspect of the present invention is the type and amount of agitation, or stirring employed, both in forming the polymerization recipe emulsion and during the reaction thereof. Prior to the start of the polymerization reaction, all of the ingredients of the polymerization recipe are agitated or stirred to form an emulsion or dispersion wherein sufficient shear action is used to disperse or suspend the monomer(s) in the reaction medium in the form of tiny droplets. This is referred to as the first stage of agitation. The droplets of monomer(s) should be of such size that when transformed into polymer particles, which are spherical and porous, the same will be of the desired size. The polymer particles produced in accordance with the present invention should have a diameter in the range of about 30 microns to about 1000 microns. Preferably, for most end uses, the polymer particles will have a diameter in the range of about 80 microns to about 300 microns.

It is most important to choose and maintain the proper and sufficient agitation throughout the polymerization reaction and the various stages of conversion thereof in order to produce the spherical and porous particles of polymer having the proper or desired size. Various means can be employed to get and maintain the proper agitation and shearing action. The reaction vessel or polymerizer is made of stainless steel or glass lined and fitted with a heating and cooling jacket and having a rotatable shaft mounted centrally thereof. On said shaft are mounted one or more threepronged agitator blades with more or less than three prongs may be used. Further, baffles are mounted internally of the reaction vessel which gives an up and down, or pumping, action to the reaction medium in addition to the circular motion thereof. One or more baffles are employed mounted on the inner wall of the reactor or adjacent thereto.

The amount and manner of agitation desired to necessary to obtain the desired results will vary depending upon the particular monomer or monomers being polymerized. Also, the particular polymer particle size desired in the end product. This means that the rpm. of the rotatable shaft carrying the agitator blades must be regulated within certain prescribed limits. There are many variables involved in obtaining the optimum conditions for any particular polymerization recipe, such as, for example, the size of the reactor, the number of blades and prongs thereon, as well as the shape thereof, which will dictate the rpm. to be employed in obtaining the desirable particle size, as well as the desired porosity of the polymer particles. In the usual case, using a polymerization reaction having a capacity of about 30 gallons, an rpm., with a plurality of agitator blades, such as one of the Pfaulder type, in the range of about 50 rpm. to about 250 rpm. is satisfactory. It must be borne in mind, however, that as the reactor capacity is increased or decreased, adjustment in the diameter width and pitch of the blades must be made in order to achieve the desired agitation and shear action. This adjustment can readily be made by those skilled in the art without undue difficulty. It should also be noted that the agitation and shear action will also be influenced by the monomer(s) being polymerized and the temperature of the polymerization reaction.

As pointed out, the rpm of the rotatable shaft carrying the agitator blades will vary over a wide range depending upon the size of the reactor. For example, when using a reactor having a capacity of about 40,000 gallons, a rotatable shaft, equipped with a plurality of agitator blades, will be operated at an rpm in the range of abut 20 rpm. to about 120 rpm. during the first stage of agitation using the Pfaulder type mixer. The rpm. when using a Helix type mixer will usually be slightly smaller than when using a Pfaulder type mixer. In general, when using reactors ranging in size from 30 gallon capacity up to and including 40,000 gallon capacity an rpm in the range of about 10 to about 275 rpm. is satisfactory when employing a Pfaulder type mixer or a Helix type mixer.

A more convenient method of describing agitation and shear action is in terms of blade tip speed in terms of feet per second. The tip speed will be the same irrespective of the number of blades mounted on the rotatable shaft. There is a correlation between the rpm of the shaft and the blade tip speed. The tip speed is determined by the following formula:

$$\frac{D(\text{agitator}) \text{ in Feet} \times 3.14 \times \text{rpm}}{60} = \text{Tip speed in feet/second.}$$

Wherein D is the diameter of the circle inscribed in the blade or blades. In the following table there is shown the relationship between rpm and blade tip speed in two different size reactors using a Pfaulder-type mixer and a helix-type mixer. "D" in the table refers to diameter in feet.

TABLE I

| 30-GALLON REACTOR | | D Reactor = 1.4 ft. |
| --- | --- | --- |
| | | D Pfaudler = 1.0 ft. |
| | | D Helix = 1.3 ft. |
| | RPM | TIP SPEED (FT/SEC.) |
| Pfaudler | 50 | 2.6 |
| | 250 | 13.1 |
| Helix | 40 | 2.7 |
| | 200 | 13.6 |
| 40,000-GALLON REACTOR | | D Reactor = 16 ft. |
| | | D Pfaudler = 8 ft. |
| | | D Helix = 15 ft. |
| | RPM | TIP SPEED (FT./SEC.) |
| Pfaudler | 20 | 8.3 |
| | 120 | 50.2 |
| Helix | 10 | 7.8 |
| | 80 | 62.8 |

In order to obtain satisfactory results when employing the present invention, the blade tip speed will be in the range of abut 2 ft./sec. to about 65 ft./sec. during the first stage of agitation.

In the present invention, it is not only important to choose the proper agitation, or proper rpm., but the agitation is done in stages wherein the rpm. varies in each stage. This can be referred to as agitation ramping of a sort. As pointed out above, the first stage of agitation is that of forming the dispersion or emulsion of the ingredients prior to the start of polymerization. In the next stage, or second stage, agitation or stirring is employed but at a rate lower than the first stage. The second stage commences with the start of the polymerization reaction and continues until a conversion of monomer(s) to polymer of about 10.0% to about 30.0%. Thereafter, in the third stage, the stirring is increased but the rate is not above the rate of stirring in the first stage. The third stage continues to completion of the reaction which will be a total conversion of about 60.0% to about 90.0%.

The range of rpm. of the agitator in the first stage, wherein the polymerization dispersion or emulsion is formed, using a Pfaudler or like agitator, has been set out above. In the second stage, in the first part of the polymerization reaction, the rpm. of the agitator will be in the range of 0 rpm. to about ¼ of the rpm employed in the first stage. In the third or final stage the rpm. will be in the range of 0 rpm. to a maximum which is equal to the rpm. employed in the first stage. To give an example, keeping in mind that the size of the reactor has a great influence on the rpms., when polymerizing vinyl chloride, in accordance with the present invention and using a three liter reactor, an rpm. of 600 will be used in the first stage, an rpm. of 70 is used in the second stage from 0% to 30% conversion, and an rpm. of 400 is used in the third stage from 30% to 70% conversion, or completion of the reaction.

It is to be noted that in the second and/or third stages one can conduct the reaction with no stirring or agitation. However, due to the exothermic nature of the reaction, it is generally advantageous to agitate the reaction mixture in order to facilitate heat removal. In fact, that is one of the main problems with a totally quiescent polymerization reaction wherein the heat removal is difficult and very expensive. The advantage of the present invention is that, by virtue of the surfactant system employed, the polymerization medium can be agitated to varying degrees throughout the entire reaction period.

When using stirring, as in the present process, the polymer particles produced have an average particle size and size distribution substantially the same as corresponding polymers made quiescently. However, the polymer particles of the instant invention have a substantially higher porosity than the quiescently produced polymers. For example, using the same recipe and the same final conversion conditions, a quiescently produced polymer had a porosity, measured with a mercury porosimeter of 0.1052 cc./gm. at 86% conversion while a polymer, produced using stirring at 1 rpm. up to 30% conversion and then at 50 rpm. to 86% conversion, had a porosity of 0.2213 cc./gm. Similar results have always been obtained regardless of the surfactant system employed.

The polymerization process of the present invention may be carried out at any temperature which is normal for the monomeric material to be polymerized. Usually, a temperature in the range of about 30° C. to about 100° C. will be employed with most known polymerizable monomeric materials as set out hereinabove, Preferably, a temperature in the range of about 40° C. to about 70° C. is employed. The temperature is controlled during the polymerization process by keeping the reaction medium in contact with cooling surfaces. This is accomplished by passing a cooling medium, such as water, brine, and the like, through the jacket surrounding the reaction vessel or polymerizer. The cooling is necessary since most all of the polymerization reactions are exothermic in nature. It is understood, of course, that, where necessary, a heating medium can be circulated through the jacket.

One of the problems encountered in the polymerization of unsaturated monoolefinic monomers is the undesirable polymer buildup that occurs on the interior surfaces of the reactor. This buildup of polymers interferes with heat transfer, decreases productivity, and adversely affects polymer quality. Various means have been proposed to alleviate polymer buildup, such as coating of the internal surfaces of the polymerization reactor prior to conducting the polymerization process therein. However, in the use of the process of the invention, unexpectedly, polymer buildup is substantially eliminated without the need of coating the reactor surfaces or adding a polymer buildup inhibitor to the polymerization recipe. It is not known why the present invention reduces polymer buildup, but the advantage thereof will be readily apparent to those skilled in the art.

In order to rate the buildup in the various polymerizations of the present invention, as particularly set forth in the specific examples which follow hereinafter, a rating scale has been devised with respect to paper and sandy buildup. In a regular suspension polymerization process, where normal amounts of both types of buildup occur, the reactor is given a rating of 1.5. Any rating below 1.0 is good of a definite improvement. In other words, a rating to 0.0 is perfect, and so on.

To further illustrate the present invention, the following specific examples are given, it being understood that this is merely intended in an illustrative and not a limitative sense. In the examples, all parts and percents are by weight unless otherwise indicated.

EXAMPLE I

In this example, a stainless steel three liter reactor equipped with a 2 blade helix agitator was employed. In addition to the dispersant, 2 surfactants were used. The following recipe was employed:

| Ingredient | Parts |
| --- | --- |
| Vinyl Chloride | 100 |
| Water (Demineralized) | 400 |
| Dispersant[1] | 0.24 |
| Pluronic P-123 (Water-Soluble) | 0.30 |
| Pluronic L-61 (Oil-Soluble) | 0.50 |
| Sodium Hydroxide (25%) | 0.0212 |
| Di-secondary butyl peroxydicarbonate (SBP) | 0.03 |

[1]Polyacrylic acid crosslinked with 0.2–0.3 part/100 monomer of allyl pentaerythritol First, the catalyst (SBP) and the oil-soluble surfactant (Pluronic L-61) were dissolved in the vinyl chloride and stored at 0° C. The reactor was then charged with the water and dispersant and the water-soluble surfactant (Pluronic P-123) was added thereto. The reactor was evacuated and the agitator rotated at 600 rpm. With the agitator running, the vinyl chloride mixture was added and the stirring continued until the vinyl chloride was emulsified into the proper size droplets. The reactor was then filled with water containing the dispersant in the same proportion as in the original mixture. The temperature was raised to the reaction temperature (55° C.) and the sodium hydroxide was injected into the reactor. Thereafter the agitator speed was reduced to 70 rpm. and held there until 20–30% conversion was reached. Then the agitator speed was increased to 400 rpm. and held there until completion of the reaction or 70% conversion. The dispersant in water mixture was continuously added to the reactor as the volume decreased due to formation of polymer in order to keep the reactor full. The time of reaction was 4.5 hours at which time the reactor was cooled rapidly and the polymer slurry removed. The pH of the slurry was 5.1. The reactor was examined for polymer buildup with the following rating: Paper buildup 0.9 and Sandy buildup 0.9. Tests were run on the recovered and dried polymer with the following results:

| | |
| --- | --- |
| Average particle size | 111.5 microns |
| Particle size distribution | 33.7% |
| Porosity | 0.242 cc./gram |
| Power Mix Time[1] | 638 seconds |

[1]Powder mix time is the time in seconds it takes the dry polymer to absorb plasticizer.

The porosity was measured with a mercury porosimeter. The polymer produced was spherical and unagglomerated.

EXAMPLE II

In this example two runs were made using the same recipe in order to compare the porosity of the polymer particles when produced by the present invention and when produced quiescently, i.e., without stirring. The recipe used was as follows:

| Ingredient | Parts |
|---|---|
| Vinyl chloride | 100 |
| Water (demineralized) | 800 |
| Dispersant[(1)] | |
| Igepal CO-880[(2)] (Water-Soluble) | 0.08 |
| Igepal CO-430[(3)] (Oil-Soluble) | 0.10 |
| Sodium hydroxide (25%) | 0.58 ml. |
| Di-secondary butyl peroxydicarbonate (SBP) | 0.06 |

[(1)]Polyacrylic acid crosslinked with 0.2–0.3 part/100 monomer of allyl pentaerythritol.
[(2)]Nonylphenoxy poly (30) ethyleneoxy ethanol
[(3)]Nonylphenoxy poly (4) ethyleneoxy ethanol
(Note: The IGEPAL surfactants are made and sold by GAF Corp., Chemical Products.)

The procedure of Example I was followed except for the agitation. In both runs the agitator was operated at 600 rpm. to emulsify the vinyl chloride into the proper droplet size. In one run (quiescent) the agitation was stopped at the beginning of the reaction and no further stirring was employed. In the other run, the agitator was run at 1 rpm. up to 30% conversion and then at 50 rpm. until completion of the reaction (86% conversion). The reactor was examined, in each case, upon completion to determine the polymer buildup. The porosity of the polymers was measured with a mercury porosimeter. The results were as follows:

| Run Buildup | Quiescent | Stirred |
|---|---|---|
| Paper | 0.5 | 0.5 |
| Sandy | 0.0 | 0.0 |
| Porosity | 0.1052 cc/gram | 0.2213 cc/gram |

As can be seen, the porosity was substantially higher (over 100% higher) when using the present invention.

EXAMPLE III

In this example, two runs were made to show the effect of using one surfactant in the system which does not contain a polyethylene oxide (PEO) segment. When using PEO containing surfactants, a skin is formed around the polymer particle. Two runs were made to demonstrate the difference, particularly with respect to Powder Mix Time. The recipes employed were as follows:

| | Run No. | |
|---|---|---|
| Ingredient | 1 Parts | 2 Parts |
| Vinyl Chloride | 100 | 100 |
| Water (demineralized) | 150 | 150 |
| Dispersant[(1)] | 0.12 | 0.12 |
| Igepal CO-730[(2)] (Water-soluble) | 0.57 | 0.08 |
| Igepal CO-210[(3)] (Oil-soluble) | 0.12 | — |
| Alcotex ®[(4)] | — | 0.03 |
| Sodium hydroxide (25%) | 0.22 ml. | 0.23 ml. |
| Di-secondary butyl peroxy-dicarbonate | 0.02 | 0.02 |

[(1)]Polyacrylic acid crosslinked with 0.2–0.3 part/100 monomer of allyl pentaerythritol.
[(2)]Nonylphenoxy poly (15) ethyleneoxy ethanol.
[(3)]Nonylphenoxy poly (1.5) ethyleneoxy ethanol.
[(4)]72.5% hydrolyzed polyvinyl acetate.

The procedure of Example I was followed except for the agitation. In Run No. 1, the agitator was operated at 600 rpm. to emulsify the vinyl chloride. After addition of the NaOH, the agitator speed was adjusted to 50 rpm. until 20% conversion was reached. Then the agitator speed was raised to 400 rpm. and held there until completion of the reaction (70% conversion). The only difference in Run No. 2 was that the agitator was operated at 400 rpm. during emulsification and at 65 rpm. in the second stage. The reactor was examined, in each case, upon completion of the reaction to determine the polymer buildup. The powder mix time of the polymers was measured and the results were as follows:

| | Run No. | |
|---|---|---|
| Buildup | 1 | 2 |
| Paper | 0.5 | 0.0 |
| Sandy | 0.0 | 1.0 |
| Powder Mix Time (Seconds) | 544 | 382 |

It can readily be seen from these results that the polymer buildup was still relatively low but the Powder Mix Time was vastly improved when part of the recipe was replaced with a non PEO segment containing surfactant (Alcotex). This is attributed to the fact that the skin structure of the polymer particles is substantially modified. The skin, instead of being continuous, now has holes in it leading to the porous interior of the polymer particle. This greatly improves the plasticizer uptake rate. The holes in the skin were observed with a scanning electron microscope (SEM).

The present invention has many advantages, chief among which is the production of highly porous and spherical particles of polymer. This in turn enhances the plasticizer uptake of the polymer. In addition, polymer buildup in the reactor is substantially reduced thus affording more efficient heat transfer. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by scope of the appended claims.

I claim:

1. A process for producing spherical particles of polymer having high porosity which comprises, polymerizing one or more ethylenically unsaturated monomers having at least one terminal $CH_2=C<$ group in the form of discrete droplets in an aqueous reaction medium containing, a monomer-soluble free radical yielding catalyst, a dispersant comprising a water-insoluble, crosslinked interpolymer of acrylic acid, and at least one surfactant containing one or more poly (ethylene oxide) segments, agitating said medium to form droplets of monomer(s) therein said agitator being operated at an rpm. in the range of about 10 rpm to 275 rpm. with a blade tip speed in the range of about 2 ft./sec. to about 65 ft./sec using a reactor having a capacity of about 30 gallons to about 40,000 gallons, adding a water-soluble base to said medium to neutralize the dispersant to a pH of from about 4 to about 7, polymerizing said monomer(s) in a first stage at a temperature in the range of about 1.0° C. to about 100° C. with agitation below that at which the dispersion was formed, continuing the polymerizaton at said temperature and agitation to a conversion of about 10% to about 30% then increasing the agitation in a second stage to a level not more than that at which the dispersion was formed at the same temperature as in said first stage until the reaction is complete, and recovering the spherical, porous particles of polymer having a diameter in the range of about 30 microns to about 1000 microns, wherein polymer buildup on the surfaces of the reactor is substantially reduced.

2. A process as defined in claim 1 wherein the monomer is vinyl chloride.

3. A process as defined in claim 1 wherein the dispersant is employed in the range of about 0.02% to about 2.0% by weight, based on the weight of the monomer(s).

4. A process as defined in claim 1 wherein the surfactant is employed in the range of about 0.005% to about 1.0% by weight, based on the weight of the monomer(s).

5. A process as defined in claim 1 wherein the dispersant is polyacrylic acid crosslinked with 0.2 to 0.3 part/100 parts of monomer of allyl penaerythritol.

6. A process as defined in claim 1 wherein the surfactant is a combination of an oil-soluble and a water-soluble surfactant.

7. A process as defined in claim 1 wherein the surfactants are nonylphenoxy poly (4) ethyleneoxy ethanol and nonylphenoxy poly (30) ethyleneoxy ethanol.

8. A process as defined in claim 1 wherein the surfactants are nonylphenoxy poly (15) ethyleneoxy ethanol and nonylphenoxy poly (1.5) ethyleneoxy ethanol.

9. A process as defined in claim 2 wherein the dispersant is employed in the range of about 0.02% to about 2.0% by weight, based on the weight of the monomer.

10. A process as defined in claim 9 wherein the surfactant is employed in the range of about 0.005% to about 1.0% by weight, based on the weight of the monomer.

11. A process as defined in claim 10 wherein the dispersant is polyacrylic acid crosslinked with 0.2 to 0.3 part/100 parts of monomer of allyl penaerythritol.

12. A process as defined in claim 11 wherein the surfactant is a combination of an oil-soluble and a water-soluble surfactant.

13. A process as defined in claim 11 wherein the surfactants are nonylphenoxy poly (4) ethyleneoxy ethanol and nonylphenoxy poly (30) ethyleneoxy ethanol.

14. A process as defined in claim 11 wherein the surfactants are nonylphenoxy poly (15) ethyleneoxy ethanol and nonylphenoxy poly (1.5) ethyleneoxy ethanol.

15. A process as defined in claim 11 wherein the surfactants are nonylphenoxy poly (15) ethyleneoxy ethanol and sorbitan monooleate.

16. A process as defined in claim 11 wherein the surfactants are nonylphenoxy poly (30) ethyleneoxy ethanol and sorbitan monooleate.

* * * * *